Figure 1:
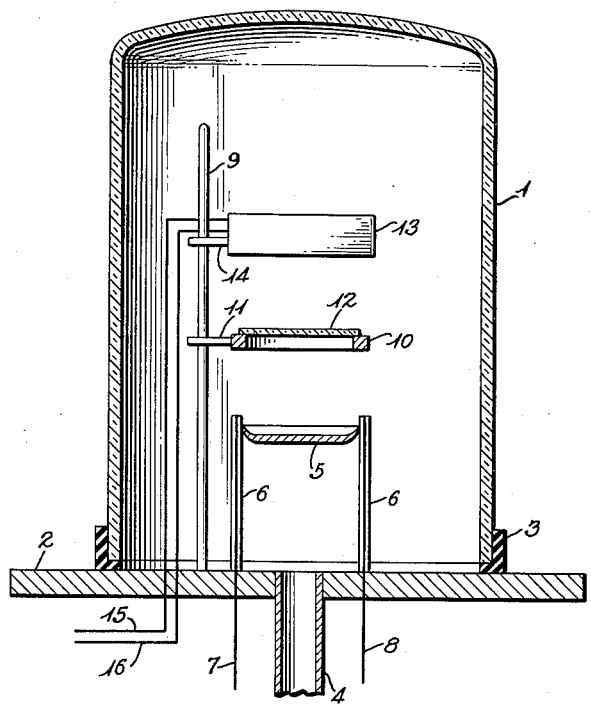

Aug. 29, 1961

C. FELDMAN 2,998,323

METHOD FOR MAKING LUMINESCENT SCREENS

Filed April 5, 1957

INVENTOR

*Charles Feldman*

BY *Richard C Reed*

ATTORNEY

United States Patent Office 2,998,323
Patented Aug. 29, 1961

2,998,323
METHOD FOR MAKING LUMINESCENT SCREENS
Charles Feldman, Hollin Hills, Va., assignor to Davohn Corporation, a corporation of Delaware
Filed Apr. 5, 1957, Ser. No. 650,958
7 Claims. (Cl. 117—33.5)
(Granted under Title 35, U.S. Code (1952), sec. 266)

The invention described herein may be manufactured and used by or for the Government of the United States of America for governmental purposes without the payment of any royalties thereon or therefor.

This invention relates to new luminescent screens suitable for use in cathode ray tubes.

Transparent luminescent screens have the known advantage in cathode ray tubes of minimizing light scattering and giving better definition in the light image than the powder phosphor screens. Despite this advantage, however, little has been done by way of providing transparent luminescent screens of a luminescent brightness practical for cathode ray tubes.

It is an object of the present invention to provide new luminescent screens of a luminescent brightness practical for cathode ray tubes. It is a further object to provide new transparent and new translucent luminescent screens of a luminescent brightness practical for cathode ray tubes.

It is an object of the present invention to provide a method for producing transparent luminescent screens comprising a substrate and a film of an activated luminescent material thereon. It is a further object of this invention to provide a method for producing translucent luminescent screens comprising a substrate and a film of an activated luminescent material thereon. It is also an object of this invention to provide transparent and translucent luminous screens comprising a substrate and a film of an activated luminescent material thereon.

In accordance with my invention I have found that transparent luminous screens having films of activated phosphor thereon with a degree of luminescent brightness practical for application in cathode ray tubes can be obtained by depositing a thin film of the vapor of the phosphor and luminescence activator material on a transparent base, e.g. glass, silica glass, such as quartz glass, Vycor glass in the manner hereinafter described and subjecting the film and base to baking at a temperature within the range of from about 500 to 1200° C. for a period of up to three hours in an appropriate atmosphere. Preferably, however, the baking temperature is maintained within a range of from about 750 to 1100° C. for a period of from about 5 minutes to one hour. The optimum temperature and the optimum atmosphere vary for different luminescent materials as described hereinafter. By continuing the baking of the films for longer periods up to about 3 hours, transluscent luminescent screens of a lower light transmitting efficiency but of greater luminescent brightness can be obtained.

The initial films may be formed by co-evaporating and depositing luminescent materials containing activators or may be formed by co-evaporating and depositing separately but not necessarily simultaneously the various constituents necessary to form the luminescent material with the luminescent activator.

As examples of the luminescent materials contemplated within this invention are the silicates of zinc, calcium, cadmium, magnesium, and zinc-beryllium; the tungstates of magnesium, calcium and cadmium; the phosphates of zinc, calcium and cadmium; the sulfates of zinc and cadmium; the fluorides of zinc, calcium, cadmium and magnesium; zinc oxide and zinc borate. The activators for the above-mentioned compounds include manganese, manganese in combination with lead, titanium, and the rare earths.

The luminescent materials contemplated within this invention, also include the sulfides, the selenides and the sulfo-selenides of zinc, of cadmium and of zinc cadmium. The activators for these compounds include manganese, and silver or copper in the presence of a halogen or trivalent metal.

When employing zinc silicate, calcium silicate or magnesium silicate as the phosphor compound and a luminescence activator material, the film is baked in an atmosphere containing oxygen such as air at a temperature between about 1000 and 1200° C., preferably at about 1100° C. for a period of between about 15 minutes and 1 hour to form a luminescent film of the metal silicate. The baking is conducted until the film is activated to luminescence in the color characteristic of the activator-silicate metal combination thereof. With manganese as the activator, this color is green for zinc silicate films, an orange for calcium silicate films and red for manganese silicate films. Transparent and translucent screens in which the luminescent film contains two or more of the metal silicates in various proportions can be made in the same way, for which the metal silicates are mixed in the desired proportions prior to the vaporization thereof to form the initial films on the base. The color of the luminescence of such baked mixed metal silicate films will be the sum of the colors characteristic of the activator-silicate metals combinations therein, for example, red and green giving a yellow.

When employing zinc sulfide as the luminescent material and manganese as the luminescence activated material the film of zinc sulfide containing manganese is subjected to baking at a temperature within the range of from about 750 to 900° C. for a period of from about 5 to 15 minutes in a non-oxidizing atmosphere. The baking atmosphere may be nitrogen or other inert gas such as a rare gas, e.g., helium, neon, argon, etc., but preferably is a high vacuum, i.e., pressures of the order of $10^{-4}$ to $5 \times 10^{-5}$ mm. Hg. By continuing the baking for longer periods up to an hour, translucent luminescent screens of a lower light transmitting efficiency but of greater luminescent brightness can be obtained. The baking operation in the method of the invention requires the use of a transparent substrate or base which has a softening point at least as high as the necessary baking temperature. For films of a thickness greater than 0.5 micron, the transparent substrate may have, in addition, as I have found, a coefficient of expansion very close to that of zinc sulfide. Thinner films have less tendency to crack when heated. An experimental glass made by the National Bureau of Standards and designated F-83 meets these requirements. This glass has a deformation temperature of 710° C. but seems to be able to withstand higher temperatures for short periods. It has a coefficient of expansion of $7.1 \times 10^{-6}$ which is approximately that of zinc sulfide which is $6.7 \times 10^{-6}$. With this glass, films thicker than 5 microns can be made and baked without danger of film deterioration.

When employing zinc phosphate as the luminescent material and manganese as the activator the film is subjected to baking at a temperature within the range of from about 500 to 800° C. for a period of from 15 minutes to an hour under an atmosphere containing oxygen such as air. Depending upon the percentages of manganese the luminescent color may vary from green to red. A green color will be obtained when employing about 1 to 5 mol percent manganese. A red color will be obtained by employing manganese in from 5 to 10 mol percent.

The initial films for producing the luminescent screens of my invention are formed by an application of the known vacuum evaporation-deposition process. In the application of this process, for example, when employing an activator material, the metal silicate or mixture of metal silicates and the luminescence activator material, the silicate or mixture of metal silicates and the luminescence are vaporized and the vapors condensed on the transparent substrate within a high vacuum, e.g., of the order of $10^{-4}$ to $5 \times 10^{-5}$ mm. Hg, the process being controlled to deposit thin films of the order of thickness of about 0.5 to 5 microns on the substrate. The initial film on the substrate contains the solid components of the one or more metal silicates, but not the metal silicate as such. The solid components of the metal silicates are the metal or metal oxide, silicon or the silicon oxides including suboxides. The necessary oxygen for formation of the one or more metal silicates from the solid components in the film is supplied from the air in the subsequent air baking of the film.

The solid components of the metal silicates can be used in place of the metal silicates as starting materials for forming the initial film on the substrate, for example, zinc or zinc oxide and silicon or silica for forming a luminescent zinc silicate-magnesium silicate film. The vaporization of the solid components is conducted from separate vessels within the high vacuum and controlled so as to deposit the vapors of the solid components on the substrate in the correct proportions for forming the metal silicate therefrom in the subsequent baking of the film in the presence of oxygen (air).

The activator may be supplied in the films by using commercial activated zinc, calcium or magnesium phosphor powders for making of the films. It may be also supplied by successively or simultaneously vaporizing the activator material and the metal silicate or its solid components and condensing the vapors on the substrate within the high vacuum. Manganese is a preferred activator for the production of the luminescent screens of the invention. However, titanium or other activators can be employed. Coactivators may be used along with the activator where particular results are desired in the luminescent screens, such as sensitizing the luminescent film to ultraviolet light or improving the persistence of the luminescence thereof. Lead may be used along with manganese in the making of luminescent films of calcium silicate to render the films sensitive to ultraviolet light and is vaporized separately and simultaneously with the manganese and calcium silicate in forming the initial film. Manganese, titanium and lead can be vaporized from powders thereof under a high vacuum.

Baking of the initial films after they have been deposited on the base or substrate is of great importance. Contrary to an assumption expressed in the literature the activator is not almost always lost in the vacuum evaporation-deposition process, but probably exists mostly as a separate phase in the film. The baking serves the important functions of promoting formation of e.g. the metal silicate from its components on the substrate, inducing good crystallite formation of the metal silicate and causing the activator to diffuse into the formed crystallite of the metal silicate film. The occurrence of these conditions are necessary to form luminescent films of good efficiency.

Figure 2:
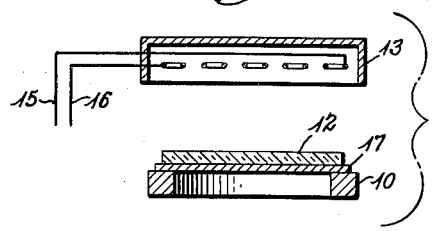

An apparatus suitable for carrying out the method of the invention is illustrated in the accompanying drawing in which:

FIG. 1 is a partly sectional view of the general arrangement of the parts of the apparatus, and FIG. 2 is a partly sectional detail view of the heating element and coated transparent base arranged for baking of the zinc sulfide film.

Referring to the drawing a vacuum cover 1, suitably made of glass, is arranged in vacuum tight relationship on a platform 2 of polished steel by means of a circumferential gasket 3 of heat-resistant rubber (neoprene). A conduit 4 is arranged through the platform 2 for evacuating the vessel 1 by means of a vacuum pump (not shown).

A boat-shaped vessel 5 of tantalum or other electrically conductive refractory material for containing the luminescent material, e.g. the metal silicate, and activator material to be evaporated is supported by means of a pair of electrically conductive (brass) standards 6. A clamping piece (not shown) is arranged on the upper end of each of the standards 6 for clamping the vessel 5 at its tapered ends to the standards. The standards 6 are attached to the platform 2 in any suitable manner and connected to the electrical leads 7 and 8 from a suitable current source. A metal standard 9 suitably attached to the platform 2 carries a steel ring 10 adjustably mounted thereon by means of a slidable clamping arm 11 extending from the ring. The transparent base or substrate 12 to be coated with the initial film rests upon the ring 10.

A radiant heater 13 of conventional design is provided in the vessel 1 for outgassing of the transparent base or substrate 12 prior to the coating operation and adjustably mounted on the standard 9 by means of a slidable clamping arm 14. It is connected by means of the electrical leads 15 and 16 to a suitable current source.

FIGURE 2 is an enlarged view showing the arrangement of the heater 13 positioned to effect baking of a zinc sulfide film on the transparent base or substrate 12 in accordance with the method of the invention. The transparent base 12 is inverted to present the zinc sulfide film directly to the heat radiating from the heater 13. A plate of tantalum 17 or of other metal which is refractory and a good reflector of heat is placed between the transparent base 12 and the ring support 10 for the baking operation. A thermocouple (not shown) is laid on the tantalum plate for measuring the temperature of the baking.

The method of my invention is carried out in the aforedescribed apparatus in the following manner and is illustrated by the preparation of a transparent luminescent zinc silicate ($Zn_2SiO_4$) screen. Transparent luminescent screens of calcium silicate ($CaSiO_3$) and of magnesium silicate ($MgSiO_3$) can be similarly prepared. A quantity of a high grade commercial zinc silicate manganese activated phosphor powder $Zn_2SiO_4(Mn)$ of 2 to 5 mol percent manganese, is placed in the tantalum boat 5. The transparent base of substrate 12 of Vycor glass (96% silica made by the Corning Glass Co.) or quartz glass is placed on the ring support 10 in position to receive the vaporized material from the boat 5. The vacuum hood or cover 1 is brought down over the substrate 12 and boat 5 in vacuum tight relationship with the platform 2 and the resulting vessel evacuated to a pressure of about $5 \times 10^{-5}$ mm Hg. The substrate 12 is out-gassed by heating in the vacuum at about 300 to 500° C. for about thirty minutes to an hour. The necessary heat is delivered by operation of the radiant heater 13. When the substrate 12 has been cleared in this way, it is cooled in the vacuum to about room temperature. Maintaining the vacuum, the tantalum boat 5 is electrically heated to evaporate the zinc silicate phosphor powder.

Deposition of the vapors occurs on the under side of the substrate 12. The duration of the evaporation will depend upon the quantity of the material to be evaporated (thickness of the film to be deposited on the substrate 12), the size of the boat 5 and the temperature of the boat. It is recommended that the evaporation and by consequence the deposition of the vapors be carried out rather slowly for best results in the film. With a tantalum boat at a temperature of about 1300° C., the duration of the evaporation should be about thirty minutes. The temperature of the boat can be determined with an optical pyrometer.

The initial film thus formed is now baked (fired) in air at a temperature of about 1000 to 1200° C., preferably at about 1100° C., for a period of from about 15 minutes to an hour until the resulting activated film of zinc silicate luminesces in green. The baking can be carried out in a conventional, electrically heated furnace.

The baking period for the films will depend in general on the thickness of the film and the temperature of the baking, the thinner films and the higher baking temperatures requiring the shorter baking periods.

By extending the baking period in air for a total firing time up to about three hours, grain growth can be induced in transparent luminescent screens of zinc silicate, calcium silicate and magnesium silicate, starting from the surface of the film. Depending on the temperature and length of the baking, fogging of the film can be effected to varying depths with resulting production of translucent luminescent screens which possess a greater degree of luminescent brightness but a lower degree of light transmission than the transparent luminescent screens. The greater the depth of the fogging of the film the greater generally the increase in luminescent brightness of the translucent screen.

In the case of a tantalum boat with zinc sulfide as the luminescent material the evaporation is carried out at a temperature of about 1050° C., the duration of the evaporation should be about one hour. The baking takes place under a vacuum of about the same magnitude as above and at a temperature of about 750 to 900° C. for about 5 to 15 minutes.

Transparent and translucent luminescent metal silicate screens of the invention may be used in the construction of cathode ray tubes for daylight viewing of the image, the inner surface of the walls of the tube being covered with a light absorbing coating. A suitable material for the coating is Aquadag (an aqueous dispersion of graphite), although other coating materials of high light absorbing quality may also be used.

The above described method is also applicable for the production of opaque luminescent screens in which the base or substrate for the luminescent film is a sheet of platinum or a ceramic plate of a metal oxide such as aluminum oxide ($Al_2O_3$) or a sheet or plate of other refractory, non-oxidizing opaque material. The luminescent films of such opaque screens can be transparent or translucent as above. Opaque luminescent screens of this kind are useful in the construction of cathode ray tubes in which indirect viewing of the light image is to be practiced. Memory tubes are illustrative of this kind of cathode ray tubes.

This application is a continuation-in-part application of my copending application, entitled "Zinc Sulfide Luminescent Screens and Methods of Making Same," filed April 2, 1957, under Serial No. 650,284, and copending application, entitled "Metal Silicate Luminescent Screens and Methods of Making Same," filed April 5, 1957, under Serial No. 651,118.

Since the invention may be variously practiced without departing from the spirit or scope thereof, it is to be understood that specific embodiments of the invention appearing in the above description shall be taken as illustrative rather than in limitation except as may be required by the appended claims.

What is claimed is:

1. A method of making a luminescent screen which comprises condensing the vaporized solid components of an oxygen dominated phosphor and a vaporized luminescence activator material within a high vacuum on a smooth surface of a refractory non-oxidizing base to form a thin film on said base containing said solid components in the correct proportions for forming the oxygen dominated phosphor therefrom on baking of said film in the presence of oxygen, and subjecting said film and base to baking in the presence of oxygen at a temperature and for a time sufficient to form a crystalline oxygen dominated phosphor and render said film luminescent.

2. A method of making a luminescent screen which comprises the steps carried out within a high vacuum of subjecting the solid components of an oxygen dominated phosphor and a luminescence activator material to evaporation and condensing the resulting vapors on a smooth surface of a refractory non-oxidizing base to form a thin film on said base containing said solid components in the correct proportions for forming the oxygen dominated phosphor therefrom on baking said film in the presence of oxygen, and subjecting said film and base to baking in the presence of oxygen at a temperature and for a time sufficient to form a crystalline oxygen dominated phosphor and render said film luminescent.

3. A method of making a luminescent screen which comprises the steps carried out within a high vacuum of evaporating an oxygen dominated phosphor and a luminescence activator material and condensing the resulting vapors on a smooth surface of a refractory non-oxidizing base to form a thin film thereon, and subjecting said film and base to baking in the presence of oxygen at a temperature and for a time sufficient to form a crystalline oxygen dominated phosphor and render said film luminescent.

4. The method is defined in claim 3, wherein the film base is a transparent refractory non-oxidizing base.

5. The method as defined in claim 3; wherein the film base is a transparent refractory glass base.

6. The method as defined in claim 3, wherein the baking of the film on the base is conducted in air.

7. The method as defined in claim 3, wherein the film base is a transparent refractory glass base and the baking of the film on the base is conducted in air.

References Cited in the file of this patent

UNITED STATES PATENTS

| | | |
|---|---|---|
| 1,954,691 | De Boer et al. | Apr. 10, 1934 |
| 2,312,229 | Anderson | Feb. 23, 1943 |
| 2,547,790 | Smith | Apr. 3, 1951 |
| 2,600,579 | Ruedy et al. | June 17, 1952 |
| 2,685,530 | Cusano et al. | Aug. 3, 1954 |
| 2,732,312 | Young | Jan. 24, 1956 |
| 2,867,541 | Coghill et al. | Jan. 6, 1959 |
| 2,876,129 | Rottgardt | Mar. 3, 1959 |